United States Patent
Jalkanen et al.

(10) Patent No.: US 12,413,956 B2
(45) Date of Patent: Sep. 9, 2025

(54) MANAGEMENT OF A SUBSCRIPTION

(71) Applicant: TELIA COMPANY AB, Solna (SE)

(72) Inventors: Tero Jalkanen, Tuusula (FI); Tomi Sarajisto, Helsinki (FI); Pierre Karlsson, Huddinge (SE)

(73) Assignee: TELIA COMPANY AB, Solna (SE)

( * ) Notice: Subject to any disclaimer, the term of this patent is extended or adjusted under 35 U.S.C. 154(b) by 367 days.

(21) Appl. No.: 17/718,882

(22) Filed: Apr. 12, 2022

(65) Prior Publication Data

US 2022/0330011 A1 Oct. 13, 2022

(30) Foreign Application Priority Data

Apr. 13, 2021 (FI) .................................. 20215434

(51) Int. Cl.
*H04W 8/18* (2009.01)
*H04W 4/02* (2018.01)

(52) U.S. Cl.
CPC ........... *H04W 8/186* (2013.01); *H04W 4/025* (2013.01)

(58) Field of Classification Search
CPC ........ H04W 8/186; H04W 4/025; H04W 8/18
USPC ........................................................ 455/411
See application file for complete search history.

(56) References Cited

U.S. PATENT DOCUMENTS

| | | | |
|---|---|---|---|
| 9,031,564 B2 * | 5/2015 | Teyeb .................. | H04W 36/324 455/436 |
| 10,716,019 B1 * | 7/2020 | Velusamy ............. | H04W 24/06 |
| 10,717,528 B1 | 7/2020 | Tran | |
| 12,108,250 B2 * | 10/2024 | Je ........................ | H04W 12/069 |
| 2011/0145068 A1 * | 6/2011 | King ..................... | G06F 16/435 348/222.1 |
| 2014/0011478 A1 | 1/2014 | Collins et al. | |
| 2016/0080933 A1 * | 3/2016 | Sarkhel ............. | H04M 1/72454 455/558 |
| 2016/0323846 A1 * | 11/2016 | Park ...................... | H04L 12/185 |
| 2018/0102831 A1 | 4/2018 | Murphy et al. | |
| 2018/0375568 A1 * | 12/2018 | De Rosa ............... | H04W 72/04 |
| 2019/0193590 A1 * | 6/2019 | Labombarda ........... | B60Q 1/52 |
| 2019/0223239 A1 * | 7/2019 | Adachi ................ | H04W 92/18 |
| 2019/0335374 A1 * | 10/2019 | Takehana .......... | H04W 36/0085 |

(Continued)

FOREIGN PATENT DOCUMENTS

WO 2020/033905 2/2020

OTHER PUBLICATIONS

Finnish Search Report dated Nov. 17, 2021, in connection with corresponding FI Application No. 20215434 (2 pp.).

(Continued)

*Primary Examiner* — Don N Vo

(74) *Attorney, Agent, or Firm* — NIXON & VANDERHYE

(57) ABSTRACT

Disclosed is a method for a management of a subscriber identity module related data, the data at least defining a mode of the subscriber identity module, the method, performed by an apparatus, including: receiving data indicative of a behavior of a device; detecting a deviation in the behavior of the device provided with the subscriber identity module compared to the mode set for the subscriber identity module; generating, in response to the detection of the deviation, a control signal to reset the mode of the subscriber identity module to correspond to the behavior of the device. Also disclosed is an apparatus, to a communication system, and to a computer program.

20 Claims, 3 Drawing Sheets

(56) References Cited

U.S. PATENT DOCUMENTS

| | | |
|---|---|---|
| 2020/0033849 A1 | 1/2020 | Yiu et al. |
| 2020/0082397 A1* | 3/2020 | Cooperman .......... H04L 9/3271 |
| 2020/0204736 A1* | 6/2020 | Byeon ..................... G06F 3/016 |
| 2021/0044995 A1 | 2/2021 | Cirkic et al. |
| 2021/0099870 A1 | 4/2021 | Moon et al. |
| 2021/0221502 A1* | 7/2021 | Godi ........................ G06T 15/00 |
| 2022/0167147 A1* | 5/2022 | Karimli ................... H04W 4/50 |

OTHER PUBLICATIONS

European Search Report issued in European Patent Application No. 22167064.9 dated Sep. 5, 2022.

\* cited by examiner

MANAGEMENT OF A SUBSCRIPTION

This application claims priority to FI Patent Application No. 20215434 filed 13 Apr. 2021, the entire contents of which are hereby incorporated by reference.

BACKGROUND OF THE INVENTION

Field of the Invention

The invention concerns in general the technical field of telecommunications. More particularly, the invention concerns a management of a subscription.

Description of the Related Art

Telecom operators sell subscriptions to users in order to enable use of a mobile communication network. The subscription refers to a so-called subscriber identity module arranged in a terminal device suitable for wireless communication. The subscriber identity module may be implemented with a hardware or a software, such as implemented in an integrated circuit card which is integrated in a terminal device. The subscriber identity module provides, among other things, network-specific information used to authenticate and identify the subscriber in the mobile communication network.

When assigning the subscription to the users the telecom operator may assume, or require, that the subscription is intended to be used in certain type(s) of terminal devices. However, due to a broad range of devices the telecom operator cannot be sure how the subscription is actually used especially as it comes to the type of device even though the telecom operator may some characteristics for the subscription, such as data speed or an amount of data allowed to be transferred in a predefined time window.

The above-described situation is not preferred for the telecom operators since the telecom operators may be willing to limit the application of the subscription to certain uses but prevent the use of the subscription in some other applications without changing rules of use, such as a charging plan or any other features. This kind of approach may allow the telecom operator to optimize the use of the mobile communication network by the subscriptions, but also to improve a profitability of the subscriptions.

Hence, there is a need to introduce novel approaches for managing the subscriptions in the mobile communication network.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, an apparatus, a communication system, and a computer program for a management of subscriber identity module related data.

The objects of the invention are reached by a method, an apparatus, a communication system, and a computer program as defined by the respective independent claims.

According to a first aspect, a method for a management of a subscriber identity module related data is provided, the subscriber identity module related data at least defining a mode of the subscriber identity module indicative of at least one characteristic for a service provision by a mobile communication network, the method, performed by an apparatus, comprising:
  receiving data indicative of a behavior of a device provided with the subscriber identity module;
  detecting, based on the data indicative of the behavior of the device provided with the subscriber identity module, a deviation in the behavior of the device provided with the subscriber identity module compared to the mode set for the subscriber identity module;
  generating, in response to the detection of the deviation, a control signal to reset the mode of the subscriber identity module to correspond to the behavior of the device.

The data indicative of the behavior of the device provided with the subscriber identity module may be derived from position data of the device. The position data may comprise a value indicative of an altitude of the device from a reference level. For example, the altitude of the device may be derived from a position data obtained by one of: beamforming a radio signal received from the device; positioning system based on Observed Time Difference of Arrival method; radar system.

The detecting of the deviation may comprise a comparison of the data indicative of the behavior of the device provided with the subscriber identity module to at least one reference profile. In response to an outcome of the comparison that the behavior of the device corresponds to that the device is an unmanned aerial vehicle the mode of the subscriber identity module may be reset to correspond to a mode of unmanned aerial vehicle. The resetting of the mode of the subscriber identity module to correspond to the mode of unmanned aerial vehicle may be configured to cause at least one of the following: application of a specific charging plan in a communication; application of a specific frequency band in a communication.

According to a second aspect, an apparatus for a management of a subscriber identity module related data is provided, the subscriber identity module related data at least defining a mode of the subscriber identity module indicative of at least one characteristic for a service provision by a mobile communication network, the apparatus configured to:
  receive data indicative of a behavior of a device provided with the subscriber identity module;
  detect, based on the data indicative of the behavior of the device provided with the subscriber identity module, a deviation in the behavior of the device provided with the subscriber identity module compared to the mode set for the subscriber identity module;
  generate, in response to the detection of the deviation, a control signal to reset the mode of the subscriber identity module to correspond to the behavior of the device.

The apparatus may be configured to derive the data indicative of the behavior of the device provided with the subscriber identity module from position data of the device. The position data may comprise a value indicative of an altitude of the device from a reference level. For example, the apparatus may be configured to derive the altitude of the device from a position data obtained by one of: beamforming a radio signal received from the device; positioning system based on Observed Time Difference of Arrival method; radar system.

Moreover, the apparatus may be configured to perform the detecting of the deviation with a comparison of the data indicative of the behavior of the device provided with the subscriber identity module to at least one reference profile. The apparatus may e.g. be configured, in response to an outcome of the comparison that the behavior of the device corresponds to that the device is an unmanned aerial vehicle, to reset the mode of the subscriber identity module to correspond to a mode of unmanned aerial vehicle. For example, apparatus may be configured to cause, by the resetting of the mode of the subscriber identity module to correspond to the mode of unmanned aerial vehicle, at least one of the following: application of a specific charging plan in a communication; application of a specific frequency band in a communication.

According to a third aspect, a communication system is provided, the communication system comprising:
- at least one device provided with the subscriber identity module;
- a mobile communication network configured to serve the at least one device provided with the subscriber identity module; and
- an apparatus according to the second aspect as defined above.

According to a fourth aspect, a computer program is provided, the computer program comprising instructions which, when the program is executed by a computer, cause the computer to carry out the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DESCRIPTION OF THE PREFERRED EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
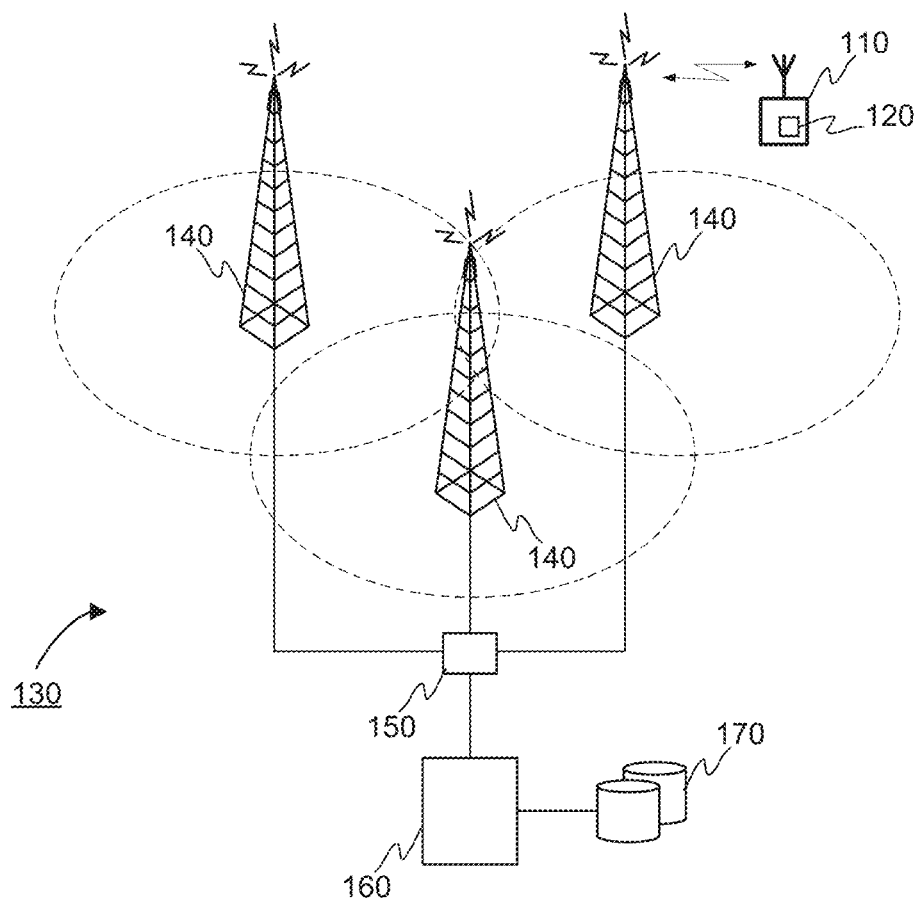
FIG. 1 illustrates schematically a communication system according to an example.

FIG. 1 illustrates schematically a communication system configured to implement a functionality in accordance with the present invention as is described in the forthcoming description. A device 110 is provided with a subscriber identity module 120 so as to allow an access to utilize one or more services of a mobile communication network 130. The device 110 may be a wireless terminal device comprising necessary hardware and software components for implementing wireless communication with at least one entity being a part of the mobile communication network 130. Moreover, the subscriber identity module 120 may be implemented as a hardware or a software solution, such as implemented in an integrated circuit card which is integrated in the device 110. The device 110 may be configured to communicate with the subscriber identity module 120 for receiving and delivering data from and to the subscriber identity module 120 for enabling the communication with the mobile communication network 130. The mobile communication network may be implemented in a cell-based manner which means that a geographical area served by the mobile communication network 130 is divided to service areas called as cells into which a radio coverage is arranged with one or more base stations 140. A number of base stations 140 may be controlled with a radio network controller 150, or any respective control entity of a radio access network. The base station controller 150, in turn, may be communicatively connected to a core network and respective entities therein. In FIG. 1, the apparatus referred with a reference 160 may be a network controller configured to perform operations in relation to a management of the mobile communication network 130 from the core network side. The apparatus may be communicatively connected to one or more data storages 170, also called as registers, which may e.g. be arranged to store subscriber related data, such as information relating to subscriber identity modules e.g. integrated, or implemented, to terminal devices, such as to the device 110. For a purpose of describing at least some aspects of the present invention the subscriber related data comprises data indicative of a mode of the subscriber identity module 120. The mode of the subscriber identity module 120 refers to data defining a purpose of use of the subscription which purpose of use is defined and granted by a telecom operator of the mobile communication network 130. This kind of approach allows the telecom operator to categorize subscriptions for different purposes and uses. As a non-limiting example of a basis for the modes of the subscriber identity modules 120 may be different application areas of the subscriber identity modules. For example, first mode may be so-called normal device mode, which is intended for terminal devices applied for normal communication by human users. A second mode may be a stationary device mode, which is intended for terminal devices requiring communication capability but installed in stationary devices, such as sensors and similar. A third mode may be a vehicle device mode, which is intended for cars and other vehicles traveling on a ground. A fourth mode may be an aerial vehicle device mode, which is intended for devices capable of traveling in air, such as unmanned aerial vehicles, UAVs, and similar. As is directly derivable from the above, the telecom operator may design different technical capabilities as well as apply different charging plan for the subscriptions intended for different modes. The data defining the above mentioned aspects, such as the mode set for the subscriber identity module, may be stored in a predefined data storage, such an applicable register of the mobile communication network, such as a subscriber database called HSS or UDM.

For describing at least some further aspects of the present invention to allow the telecom operator to monitor application of the subscriber identity modules it is hereby assumed that a device 110 is provided with a subscriber identity module 120 whose mode is set as a first mode in the data storage comprising data defining the mode for the subscription. The entity configured to perform the setting of the mode, as well as resetting it, may have access to data defining a second mode possible for the subscription. In order to maintain simplicity in describing at least some aspects of the invention no further modes are available for consideration in the described example. However, the number of selectable modes is not limited in the context of the present invention as such. As derivable from the foregoing description, in accordance with the present invention the entity may be allowed to reset the mode of the subscription in response to a detection of a fulfillment of one or more criteria as is discussed in the forthcoming description when describing the way to manage the subscriber identity module related data.

Figure 2:
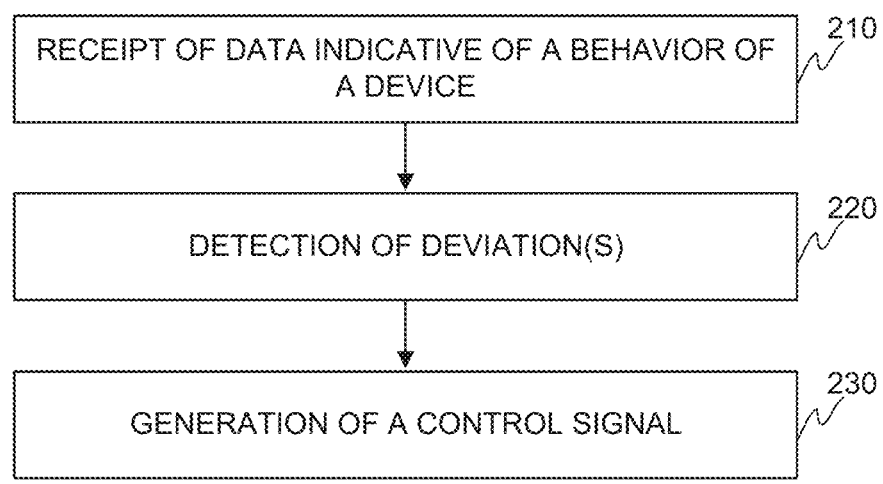
FIG. 2 illustrates schematically a method according to an example.

FIG. 2 illustrates schematically a method according to an example for a management of a subscriber identity module 120 related data, the data at least defining a mode of the subscriber identity module 120 wherein the mode is indicative of at least one characteristic for a service provision by a mobile communication network 130. Hence, the management of the subscriber identity module 120 related data may refer to setting an indicator, such as a data string, in the data storage 170 to define the mode applied for the subscriber identity module 120 provided in a device 110. As already mentioned, the telecom operator may have assigned a first mode for the subscriber identity module 120 when providing the subscriber identity module 120 to a user, and/or the device 110 in question. The method in accordance with an example may be executed, at least in part, by the apparatus 160, such as a network controller, which may receive 210 data indicative of a behavior of a device 110. The data indicative of the behavior of the device 110 may refer to data from which it is possible to derive information representing a movement of the device 110. Such data may be received at least from a positioning system capable of providing data representing a movement of the device 110. The positioning system may refer to network based positioning method which is implemented by the mobile communication network 130. Non-limiting examples of such methods may be so-called Observed Time Difference Of Arrival (OTDOA) method e.g. available in E-UTRA (LTE radio) based networks and Round Trip Time (RTT) method e.g. available in 5G based mobile communication networks. This kind of methods may be based on measurements performed by the device 110 served by the mobile communication network in question wherein the mobile communication network 130 determines the position of the device 110 based on measurement data received from the device 110. Alternatively or in addition, the positioning system may refer to a positioning performed by the device 110 wherein the device provides the position information to the mobile communication network 130, and the apparatus 160 configured to perform the method as described herein. The data indicative of the position of the device 110, but also the position information, may comprise, but is not limited to, positions of the device 110 at consecutive points in time, but also speed and/or acceleration data of the device 110. The format of the data may be dependent on the implementation of the method as well as the method applied for positioning the device 110. In view of the above, the behavior of the device 110 may at least be dependent on the data indicative of the position of the device, wherein the behavior of the device 110 may be represented with one or more values derived from the position data which may be interpreted as a behavior profile of the device 110 over the period the data is received. The one or more values may refer to absolute position of the device in a coordinate system e.g. in three-dimensional space, max/min values of a pre-agreed parameters, such as speed or acceleration, or any statistical values derived from the data received from the applied positioning system, or from the applied positioning method. In accordance with an example embodiment, the data indicative of the behavior of the device 110 comprise a data value representing an altitude of the device 110 from a reference level, such as from the ground. In some example embodiments, the behavior profile of the device 110 may be formed as one or more data values whereas in some other example embodiments the behavior profile is represented as a mathematical representation, such as a graph based on the consecutive data values. A non-limiting example of such a graph may e.g. be an altitude of the device 110 over the monitoring period the data indicative of a behavior of a device 110 provided with the subscriber identity module 120 is received. In case the altitude of the device 110 is of interest, the positioning system providing data indicative of the behavior of the device 110 shall be selected, or improved, so that the altitude information may be obtained. For example, for obtaining the altitude information beamforming a radio signal received from the device 110 may be applied to or a radar system may be implemented to cooperate with other positioning methods if not applied alone.

In response to the receipt of data indicative of the behavior of the device 110, and a processing of the data if implemented in such a way, the apparatus 160 may be configured to detect 220, based on the data indicative of the behavior of the device 110 provided with the subscriber identity module 120, at least one deviation in the data indicative of the behavior of the device 110 compared to data defining at least in part the mode set for the subscriber identity module 120 of the device 110. More specifically, the deviation may be detected so that first the data indicative of the behavior of the device 110 is compared to a number of reference data, each defining predefined modes for the subscriber identity module 120. In response to a detection of a match in the comparison, the mode matching with the pending behavior of the device 110 is compared with the mode currently defined in the data storage 170 for the subscriber identity module so as to determine if the mode currently defined for the subscriber identity module 120 corresponds to the detection of the mode based on the data indicative of the behavior of the device 110 over the monitored period.

In response to a detection 220 of a deviation between the data indicative of the behavior of the device 110 and the data defining the pending mode stored in the data storage 170 the apparatus 160 may be configured to generate 230 a control signal to reset the mode of the subscriber identity module 120 to correspond the behavior of the device 110. In other words, if the deviation is detected 220, the apparatus 160 may be arranged to update the mode of the subscriber identity module 120 to correspond the mode corresponding to the data indicative of the behavior of the device 110 in the manner as described in the context of the description of the step 220 of FIG. 2.

Figure 3:
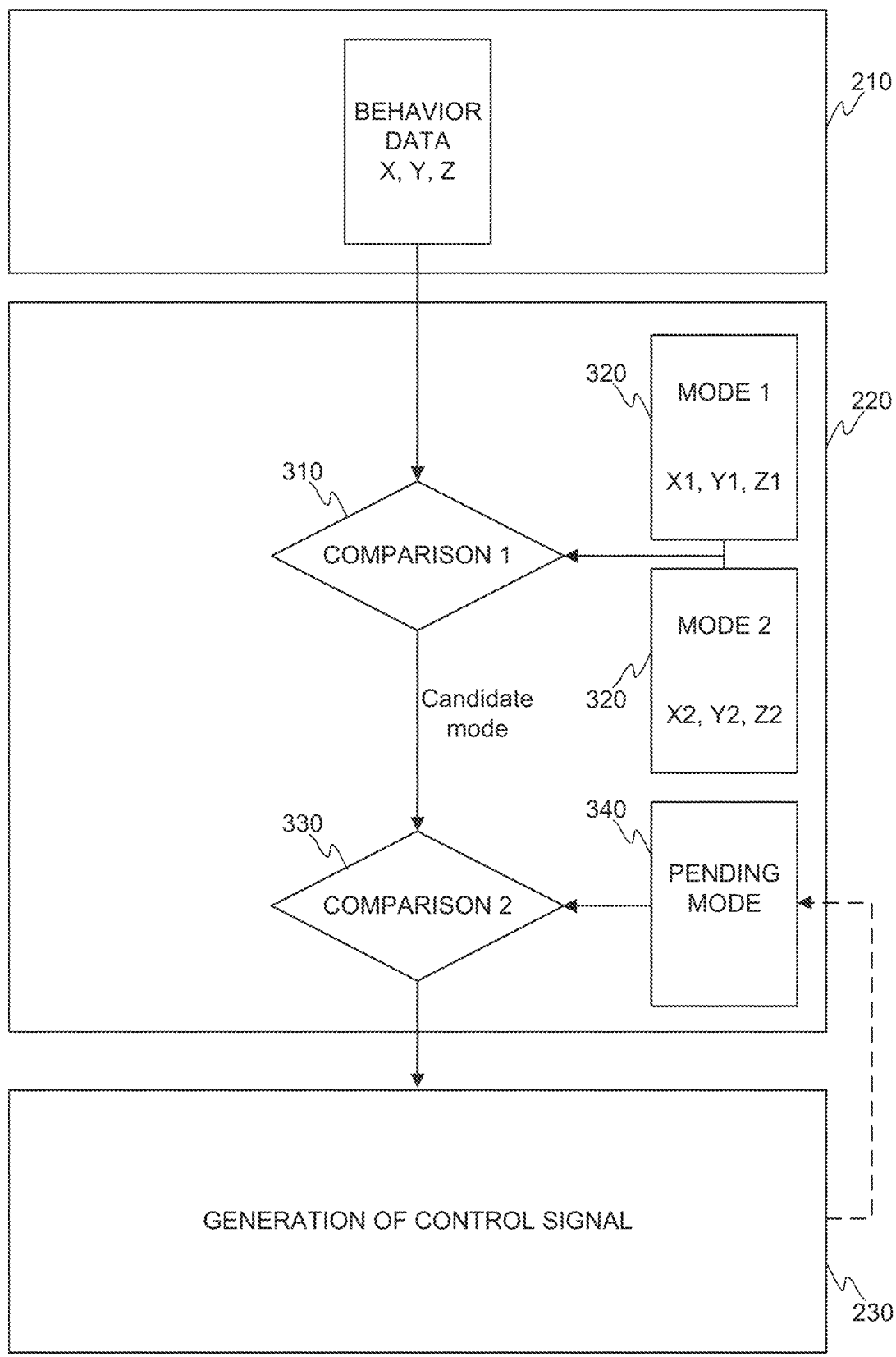
FIG. 3 illustrates schematically a method according to another example.

For sake of completeness, it is hereby referred to FIG. 3 which illustrates schematically another view to a method according to an example. FIG. 3 provides a more detailed view especially to the step of detecting a deviation between the behavior of the device 110 with respect to the mode currently defined for the subscriber identity module 120 in the data storage 170. As described earlier, the apparatus 160 may receive data indicative of the behavior of the device 110, such as position related data of the device 110. The data may be raw data or processed data. In case of the raw data, the apparatus 160 may be configured to perform the processing of the raw data to such a form that it may be applied in the method. For example, the behavior data may comprise a number of parameters referred with X, Y, Z in FIG. 3, which may e.g. represent a position of the device in a three-dimensional coordinate system. The behavior data may be input to a detection function in which it is detected 220 if the behavior of the device 110 corresponds to a mode set for the subscriber identity module 120 provided to the device 110. The detection may be performed so that a first comparison 310 is performed between the received behavior data and data defining a plurality of possible modes 320 of the subscriber identity module 120. In other words, a processing unit of the apparatus 160 may be configured to compare one or more of the parameter values in the behavior data to respective reference values defined for the modes 320 available for the subscriber identity module 120. The reference values of the first mode 320 are referred with X1, Y1, Z1 and the reference values of the second mode 320 are referred with X2, Y2, Z2, respectively, in FIG. 3 and they may define reference profiles for performing the method. The reference values are in nature such that the may be compared to values defining the behavior data of the device 110. As already mentioned, the present invention does not anyhow limit the number of modes or the number of parameters defining the modes even if FIG. 3 illustrates only two modes each defined with three parameters. Moreover, the parameters may define single values or a range, or they may be expressed in any other manner to define the profile for the respective mode as long as it is comparable with the data defining the behavior of the device 110, or derivable from the data defining the behavior of the device 110. The first comparison 310 may generate a detection that one of the available modes 320 may correspond to the behavior of the device 110 and it is set as a candidate mode which is input to a second comparison 330. The second comparison 330 is performed for determining if the pending mode 340 set for the subscriber identity module 120 corresponds to the candidate mode output from the first comparison 310. Depending on an implementation the comparison may be performed by comparing identifiers, such as data strings defining names of the modes, of the compared modes (cf. candidate mode and the pending mode 340). Alternatively or in addition, the second comparison 330 may apply the parameters defined by the respective modes so as to detect if they match or not. In response to a detection in the second comparison 330 that the modes match, no further actions are necessary (not shown in FIG. 3). Alternatively, a signal may be generated to indicate the outcome of the second comparison 330, which may also be interpreted so that no further actions are needed. In case it is detected that the candidate mode does not match with the pending mode 340 of the subscriber identity module 340, i.e. a deviation is detected, a control signal may be generated 230 to reset the pending mode 340 of the subscriber identity module 120 to correspond the behavior of the device 110. This may mean that the pending mode 340 of the subscriber identity module 120 is updated to correspond to the candidate mode received from the first comparison 310. The update is illustrated with a dashed arrow from the step 230 to the symbol of the "pending mode" 340. For sake of clarity it is also worthwhile to mention that in the implementation the pending mode 340 may be one of the available modes, cf. mode 1 or mode 2 of FIG. 3, for the subscriber identity module 120. These modes 320 may be telecom operator definable as discussed earlier.

Figure 4:
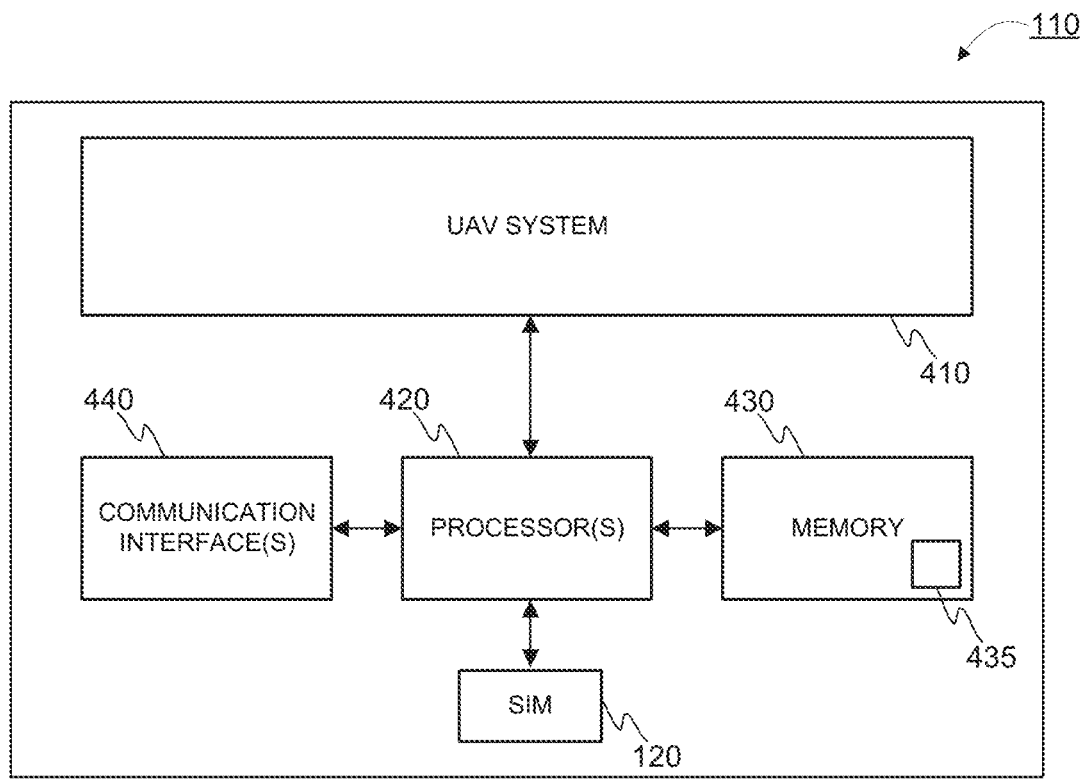
FIG. 4 illustrates schematically an unmanned aerial vehicle according to an example.

A further example embodiment employing the present invention is discussed in the forthcoming description. The invention is applied to in a context of unmanned aerial vehicles, UAV, such as with drones, which are considered to be devices 110 as discussed in the foregoing description. FIG. 4 illustrates schematically an example of an unmanned aerial vehicle, UAV, as a block diagram in order to describe further aspects of the present invention. Each entity of the UAV will be described by way of example and it shall be understood that each UAV may include more or less components than those shown and described herein. For example, the UAV may comprise an UAV system 410 including means, i.e. devices and systems, enabling a movement of the UAV. Such devices and systems may comprise motors and motor controllers which cause a power to rotors generating the lift force to the UAV. The UAV system 410 may also comprise sensors, batteries, and other similar entities, such as tools in relation to a task the UAV is intended to perform, housed in a housing forming an exterior of the UAV. Furthermore, the UAV may comprise one or more processors 420 configured to control an operation of the UAV, such as generating control signals to the motor controllers of the UAV system 410. The controlling of the operation of the UAV by the at least one processor 420 may be performed by executing a computer program code 435 stored in a memory 430, which execution of the computer program code 435 by the at least one processor 420 generates instructions to different entities in the UAV and, hence, the UAV is operative in a controlled manner. Furthermore, the UAV comprises a communication interface 440 for implementing communication between the UAV and another entity, such as the terminal device of the UAV operator. The terminal device may e.g. be a mobile phone, a tablet computer, a laptop computer, or any similar computing device implementing a communication technology used in the communication. In other words, the communication interface 440 may refer to one or more communication interfaces implementing one or more predefined wireless communication protocols. Such wireless communication protocols may refer to protocols complying with one or more of the following communication technologies: Global System for Mobile communication (GSM) (including General Packet Radio Service (GPRS) and Enhanced Data Rates for GSM Evolution (EDGE)), UMTS (including High Speed Packet Access (HSPA)), Long-Term Evolution (LTE), and 5G New Radio, for example. In other words, the respective communication interfaces 440 enable access to a mobile communication network 130 so as to establish the communication connection between the terminal device and the UAV. For accessing the mobile communication network the device 110, i.e. the UAV in the present example, is also provided with the subscriber identity module 120 which is utilized in a known manner for accessing the mobile communication network and for utilizing its services. Moreover, the subscriber identity module 120 provides a way to identify the subscriber e.g. on a basis of so-called International Mobile Subscriber Identity (IMSI) number carried in a signaling and the identifier may be used for performing the method as described by the apparatus 160 as regards to mode setting of the subscriber identity module 120.

In the context of the UAV as the device 110 the behavior of the device 110 may be determined by applying at least such a positioning system which either directly or assisted by other system may provide altitude information. Hence, due to the nature of the UAVs it is assumable that it may be detected that the device 110 ascends from a reference level, which may be defined as a ground level or a predefined altitude from the ground, such as few meters. Naturally, further criteria may be defined, such as speed related limits. Hence, the apparatus 160 may generate the behavior profile of the device 110 based on the received data e.g. from the positioning system. Moreover, in response to a detection that the altitude of the device 110 indicates the device 110 to be UAV the apparatus 160 may perform the method by finding a mode corresponding to, or dedicated to, UAVs e.g. in the first comparison step 310 of FIG. 3 and confirm if the pending mode of the subscriber identity module 120 is correct or not. In case the mode is not correct the apparatus 160 may reset the mode of the subscriber identity module 120 to correspond to a mode of UAV.

In the described manner it is possible to confirm that the information in the telecom operator's system with respect to a mode of a subscriber identity module 120 applied to in a device 110 is correct or not, and in the latter case the information may be updated in the telecom operator's system. This in turn allows the telecom operator to apply a specific charging plan in a communication of the device 110 and/or apply a specific frequency band in a communication for the device 110. In general, the telecom operator may adjust the technical features in the communication so as to serve the subscriber in an appropriate way in the mobile communication network 130.

Figure 5:
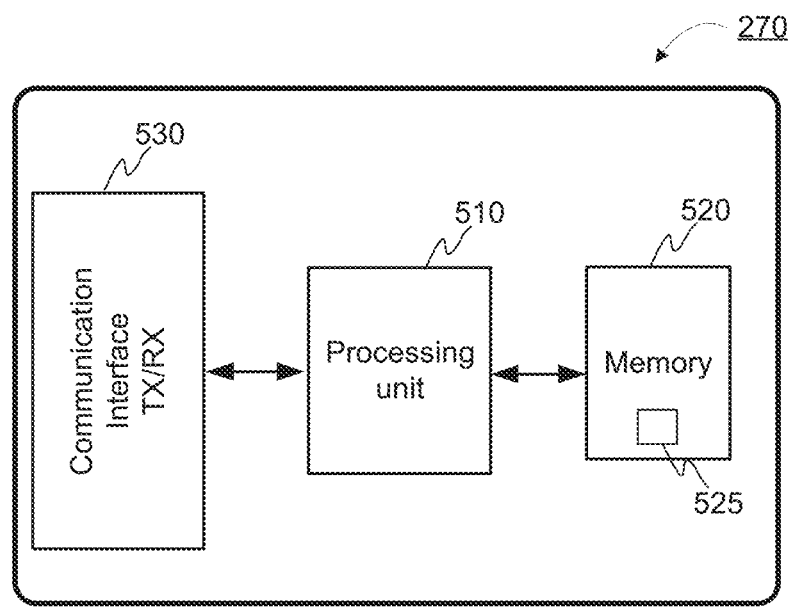
FIG. 5 illustrates schematically an apparatus according to an example.

An example of a device suitable for performing a task of the apparatus 160 according to an example embodiment the invention is schematically illustrated in FIG. 5 as a block diagram. The apparatus 160 may be configured to implement at least part of the method for managing the subscriber identity module related data as described. The execution of the method, or at least some portions of it, may be achieved by arranging at least one processor 510 to execute at least some portion of computer program code 525 stored in at least one memory 520 causing the processor 510, and, thus, the apparatus 160 to implement the method steps as described. In other words, the processor 510 may be arranged to access the memory 520 and to retrieve and to store any information therefrom and thereto. Moreover, the processor 510 may be configured to control a communication through one or more communication interfaces 530 for accessing the other entities being involved in the operation. Hence, the communication interface 530 may be arranged to implement, possibly under control of the processor 510, corresponding communication protocols, such as an IP or any other communication protocol, for communicating with one or more entities. The term communication interface 530 shall be understood in a broad manner comprising necessary hardware and software elements for implementing the communication techniques. Further, the apparatus 160 in question may comprise one or more input/output devices for inputting and outputting information. Such input/output devices may e.g. be keyboard, buttons, touch screen, display, loudspeaker, microphone camera and so on. In some implementation of the apparatus 160 at least some of the input/output devices may be external to the apparatus 160 and coupled to it either wirelessly or in a wired manner. For sake of clarity, the processor 510 herein refers to any unit or a plurality of units suitable for processing information and control the operation of the apparatus 160 in general at least in part, among other tasks. The mentioned operations may e.g. be implemented with a microcontroller solution with embedded software. Similarly, the invention is not limited to a certain type of memory 520, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

In some examples, the apparatus 160 is implemented with a distributed computing environment in which a plurality of computing devices is configured to cooperate to cause an execution of the method according to at least one of the examples as described.

As derivable from above, some aspects of the present invention may relate to a computer program which, when executed by at least one processor, cause an apparatus 160 to perform at least some portions of the method as described. For example, the computer program product may comprise at least one computer-readable non-transitory medium having the computer program code 525 stored thereon. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 525 may comprise a proprietary ap-plication, such as computer program code for executing the management of the communication connection in the manner as described.

In view of the teaching given herein a functionality of the apparatus 160 configured to perform a method in accordance with the present invention may be integrated to an applicable entity residing in a core network of a mobile communication network 130. A non-limiting example of the entity suitable for being configured to perform at least part of the method may be so-called Access and Mobility Management Function, AMF, of 5G mobile communication network. This is because the AMF is responsible for managing an access to the network, but also for managing subscribers in the network together with other entities, such as with the data storages 170 possible called as registers. According to another implementation, the apparatus 160 may be a dedicated device configured to perform a management of one or more subscriber identity modules in accordance with the present method as described. For example, it may be arranged to cooperate with the AMF to enable a delivery of the control signal through the AMF. In such an implementation the apparatus 160 may reside in the core network or external to that as long as it is communicatively reachable from the core network, and an access to data storage 170 is also available, for instance.

For sake of clarity it is worthwhile to mention that even if it is hereby mainly referred to a subscriber identity module when describing aspects to a management of the related data it does not refer to any explicit physical entity, such as an integrated smart card for example, but merely to a subscription to access and use services provided by a mobile communication network. Hence, the device may be provided, or equipped, with a subscriber identity module and the data managed in the network represents the subscriber and is associated to the subscriber identity module provided in the device in any known manner (cf. smart card or software implementation or any combination of these). Consequently, the data is subscriber identity module related data managed in the network, or entities therein, in the manner as described in the description herein.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for management of a subscriber identity module related data, the subscriber identity module related data at least defining a mode of the subscriber identity module indicative of at least one characteristic for a service provision by a mobile communication network, the method, performed by an apparatus, comprising:
    receiving data indicative of a behavior of a device provided with the subscriber identity module, the data indicative of the behavior of the device being at least received from a positioning system executed in the device provided with the subscriber identity module, the data indicative of the behavior of the device with the subscriber identity module representing a movement of the device,
    detecting, based on the data indicative of the behavior of the device provided with the subscriber identity module, a deviation in the behavior of the device provided with the subscriber identity module compared to the mode set for the subscriber identity module,
    generating, in response to the detection of the deviation, a control signal that operates to reset the mode of the subscriber identity module to correspond to the behavior of the device.

2. The method of claim 1, wherein the data indicative of the behavior of the device provided with the subscriber identity module is derived from position data of the device.

3. The method of claim 2, wherein the detecting of the deviation comprises a comparison of the data indicative of the behavior of the device provided with the subscriber identity module to at least one reference profile.

4. The method of claim 2, wherein the position data comprises a value indicative of an altitude of the device from a reference level.

5. The method of claim 4, wherein the detecting of the deviation comprises a comparison of the data indicative of the behavior of the device provided with the subscriber identity module to at least one reference profile.

6. The method of claim 4, wherein the altitude of the device is derived from the position data obtained by one of: beamforming a radio signal received from the device; positioning system based on Observed Time Difference of Arrival method; radar system.

7. The method of claim 6, wherein the detecting of the deviation comprises a comparison of the data indicative of the behavior of the device provided with the subscriber identity module to at least one reference profile.

8. The method of claim 1, wherein the detecting of the deviation comprises a comparison of the data indicative of the behavior of the device provided with the subscriber identity module to at least one reference profile.

9. The method of claim 8, wherein, in response to an outcome of the comparison that the behavior of the device corresponds to that the device is an unmanned aerial vehicle, resetting the mode of the subscriber identity module to correspond to a mode of unmanned aerial vehicle.

10. The method of claim 9, wherein the resetting of the mode of the subscriber identity module to correspond to the mode of unmanned aerial vehicle is configured to cause at least one of the following: application of a specific charging plan in a communication; application of a specific frequency band in a communication.

11. A non-transitory computer-readable medium on which is stored a computer program comprising instructions which, when the program is executed by a computer, cause the computer to carry out the method according to claim 1.

12. An apparatus for management of a subscriber identity module related data, the subscriber identity module related data at least defining a mode of the subscriber identity module indicative of at least one characteristic for a service provision by a mobile communication network, the apparatus configured to:
    receive data indicative of a behavior of a device provided with the subscriber identity module, the data indicative of the behavior of the device being at least received from a positioning system executed in the device provided with the subscriber identity module, the data indicative of the behavior of the device with the subscriber identity module representing a movement of the device,
    detect, based on the data indicative of the behavior of the device provided with the subscriber identity module, a deviation in the behavior of the device provided with the subscriber identity module compared to the mode set for the subscriber identity module,
    generate, in response to the detection of the deviation, a control signal that operates to reset the mode of the subscriber identity module to correspond to the behavior of the device.

13. The apparatus of claim 12, wherein the apparatus is configured to derive the data indicative of the behavior of the device provided with the subscriber identity module from position data of the device.

14. The apparatus of claim 13, wherein the position data comprises a value indicative of an altitude of the device from a reference level.

15. The apparatus of claim 14, wherein the apparatus is configured to derive the altitude of the device from the position data obtained by one of:
    beamforming a radio signal received from the device; positioning system based on Observed Time Difference of Arrival method; radar system.

16. The apparatus of claim 13, wherein the apparatus is configured to perform the detecting of the deviation with a comparison of the data indicative of the behavior of the device provided with the subscriber identity module to at least one reference profile.

17. The apparatus of claim 12, wherein the apparatus is configured to perform the detecting of the deviation with a comparison of the data indicative of the behavior of the device provided with the subscriber identity module to at least one reference profile.

18. The method of claim 17, wherein the apparatus is configured, in response to an outcome of the comparison that the behavior of the device corresponds to that the device is an unmanned aerial vehicle, to reset the mode of the subscriber identity module to correspond to a mode of unmanned aerial vehicle.

19. The apparatus of claim 18, wherein the apparatus is configured to cause, by the resetting of the mode of the subscriber identity module to correspond to the mode of unmanned aerial vehicle, at least one of the following:
application of a specific charging plan in a communication; application of a specific frequency band in a communication.

20. A communication system comprising:
at least one device provided with the subscriber identity module,
a mobile communication network configured to serve the at least one device provided with the subscriber identity module, and
an apparatus according to claim 12.

\* \* \* \* \*